(12) United States Patent
Kajiwara

(10) Patent No.: US 6,279,463 B1
(45) Date of Patent: Aug. 28, 2001

(54) COOKING APPARATUS

(75) Inventor: Tokuji Kajiwara, Tokyo (JP)

(73) Assignee: Kajiwara Kogyo Co., Ltd. (JP)

( * ) Notice: Subject to any disclaimer, the term of this patent is extended or adjusted under 35 U.S.C. 154(b) by 0 days.

(21) Appl. No.: 09/575,952

(22) Filed: May 23, 2000

(30) Foreign Application Priority Data

Apr. 4, 2000 (JP) .................................................. 12-102776

(51) Int. Cl.[7] .............................. A23L 1/00; A21C 1/04; B01F 7/00; B01F 7/02
(52) U.S. Cl. .................................. 99/331; 99/348; 99/455; 366/145; 366/146; 366/149; 366/279; 366/601
(58) Field of Search ..................... 99/348, 455, 352–355; 62/325–333, 342; 366/144–149, 279, 601, 314

(56) References Cited

U.S. PATENT DOCUMENTS 4,357,112 * 11/1982 Davis ..................................... 366/279
4,583,863 * 4/1986 Pandolfi ............................... 366/149

FOREIGN PATENT DOCUMENTS 9308574    12/1997  (JP) .
11253776    9/1999  (JP) .

\* cited by examiner

Primary Examiner—Timothy F. Simone
(74) Attorney, Agent, or Firm—John S. Pratt, Esq.; Kilpatrick Stockton LLP

(57) ABSTRACT

A cooking apparatus has a cooking vessel (1), a bottom heater (3) for heating the bottom (13) of the cooking vessel, a heat exchanging jacket (5) for passing steam to exchange heat with the body of the cooking vessel, a fluid source (7) for supplying and draining the steam to and from the heat exchanging jacket, a weighing unit (9) for detecting the gross weight of the cooking vessel and heat exchanging jacket, a memory (11) for storing a reference weight change corresponding to a water-content change, and a controller (11) for controlling the bottom heater and fluid source to attain the reference weight change.

6 Claims, 7 Drawing Sheets

COOKING APPARATUS

BACKGROUND OF THE INVENTION

1. Field of the Invention

The present invention relates to a cooking apparatus capable of achieving hybrid cooking with high-temperature gas that heats the bottom of a cooking vessel and high-calorie steam that heats the body of the cooking vessel.

2. Description of the Related Art

A conventional cooking apparatus has a cooking vessel for receiving and cooking food materials and a gas heater arranged under the bottom of the cooking vessel to heat the same. Processes of cooking, for example, frying food materials such as vegetables with the prior art will be explained.

A large quantity of vegetables are charged into the cooking vessel up to the top thereof. The gas heater heats the bottom of the cooking vessel to a high temperature. As the vegetables are fried, they shrink from the top of the cooking vessel toward the bottom thereof and are fried at the bottom with the gas heater.

Frying a large quantity of food materials such as vegetables only with high-temperature heat generated by the gas heater arranged under the bottom of the cooking vessel takes a long time. Namely, it takes a long time to reduce the volume of the food materials to the bottom of the cooking vessel. If a cooking temperature is increased to shorten the cooking time, the food materials will burn and stick to the inside of the cooking vessel.

A water content in the cooking vessel, or the ratio of the weight of water within and around food materials in the cooking vessel to the weight of all materials in the cooking vessel, is an important factor to burn food materials in the cooking vessel, and therefore, it must correctly be controlled during cooking. When boiling down food materials to cook bean paste, sauce, or soup in the cooking vessel, a water content in the cooking vessel greatly affects the taste of the food. Accordingly, the timing of stopping the boiling must correctly be controlled. To achieve this, the prior art forces workers to sample and taste food materials boiled in the cooking vessel carefully. This method frequently destabilizes the quality of a cooked state of the food materials.

To correctly control a water content, workers must always pay attention to the conditions of food materials in the cooking vessel until the completion of cooking and must have masterly skill to manage this. Shortening a cooking time to, for example, a half of a usual cooking time makes the monitoring of water content difficult for workers. A simple carelessness may result in missing a correct water content. Accordingly, the prior art must limit a cooking speed to correctly control a water content.

SUMMARY OF THE INVENTION

An object of the present invention is to provide a cooking apparatus capable of correctly and simply controlling a water content while shortening a cooking time.

In order to accomplish the object, a first aspect of the present invention provides a cooking apparatus having a cooking vessel for receiving and cooking food materials, a bottom heater arranged under the bottom of the cooking vessel, for heating the bottom of the cooking vessel, a heat exchanging jacket arranged along the body of the cooking vessel and defining a closed space for passing a thermal fluid to exchange heat with the body of the cooking vessel, and a fluid source for supplying and draining the thermal fluid to and from the heat exchanging jacket.

A second aspect of the present invention provides a cooking apparatus having a cooking vessel for receiving and cooking food materials, a bottom heater arranged under the bottom of the cooking vessel, for heating the bottom of the cooking vessel, a heat exchanging jacket arranged along the body of the cooking vessel and defining a closed space for passing a thermal fluid to exchange heat with the body of the cooking vessel, a fluid source for supplying and draining the thermal fluid to and from the heat exchanging jacket, a weighing unit for supporting at least the cooking vessel and heat exchanging jacket and detecting the gross weight of at least the cooking vessel and heat exchanging jacket, a memory for storing a reference weight change corresponding to a water-content change to attain a target cooked state of the food materials, and a controller for controlling at least the bottom heater according to the detected gross weight and reference weight change.

A third aspect of the present invention forms the bottom heater of the first and second aspects with a gas heater, an electromagnetic induction heater, or an electric heater.

A fourth aspect of the present invention employs steam as the thermal fluid.

A fifth aspect of the present invention forms the weighing unit of the second aspect with load cells provided for legs of a base for supporting at least the cooking vessel and heat exchanging jacket.

A sixth aspect of the present invention makes the controller of the second aspect stop the heating of the food materials if the detected gross weight corresponds to a target water content.

According to the first aspect, the cooking vessel receives food materials. The bottom heater heats the bottom of the cooking vessel, and at the same time, the fluid source supplies and drains a thermal fluid to and from the heat exchanging jacket to exchange heat with the body of the cooking vessel. The first aspect efficiently heats the food materials from the bottom and body of the cooking vessel. Heat generated by the bottom heater is conducted from the bottom to the body of the cooking vessel. At this time, the heat exchanging jacket passes the thermal fluid to exchange heat with the body of the cooking vessel. This prevents the heat from the bottom from escaping to the outside. Instead, the heat from the bottom is efficiently conducted to the inside of the cooking vessel. The cooking apparatus of the first aspect is capable of cooking a large quantity of food materials in a short time.

According to the second aspect, the cooking vessel receives food materials. The bottom heater heats the bottom of the cooking vessel, and at the same time, the fluid source supplies and drains a thermal fluid to and from the heat exchanging jacket to exchange heat with the body of the cooking vessel. The second aspect efficiently heats the food materials from the bottom and body of the cooking vessel. Heat generated by the bottom heater is conducted from the bottom to the body of the cooking vessel. At this time, the heat exchanging jacket passes the thermal fluid to exchange heat with the body of the cooking vessel. This prevents the heat from the bottom from escaping to the outside. Instead, the heat from the bottom is efficiently conducted to the inside of the cooking vessel. The cooking apparatus of the second aspect is capable of cooking a large quantity of food materials in a short time.

In addition, the weighing unit of the second aspect detects the gross weight of at least the cooking vessel and heat exchanging jacket. The memory stores a reference weight change corresponding to a water-content change to attain a target cooked state of the food materials. The controller controls at least the bottom heater according to the detected gross weight and reference weight change. The second aspect correctly controls a water content in the cooking vessel to attain a target cooked state of food materials in the cooking vessel. Drastically shortening a cooking time requires masterly skill to control a water content in the cooking vessel. The second aspect is capable of simply and correctly controlling a water content in the cooking vessel as mentioned above and removing limits on the cooking speed of the cooking apparatus, thereby greatly reducing a total cooking time.

According to the third aspect, the bottom heater is a gas heater, an electromagnetic induction heater, or an electric heater, to surely heat the bottom of the cooking vessel to a high temperature.

According to the fourth aspect, the fluid source supplies and drains steam to and from the heat exchanging jacket. The steam exchanges heat with the cooking vessel to surely reduce a cooking time.

According to the fifth aspect, the weighing unit includes load cells provided for legs of the base for supporting at least the cooking vessel and heat exchanging jacket, to correctly detect the gross weight of at least the cooking vessel and heat exchanging jacket.

According to the sixth aspect, the controller stops the heating of the cooking vessel if a detected gross weight corresponds to a target water content, to surely achieve a required cooked state of food materials in the cooking vessel.

DESCRIPTION OF THE PREFERRED EMBODIMENTS

Various embodiments of the present invention will be explained with reference to the accompanying drawings.

(First Embodiment)

Figure 1:
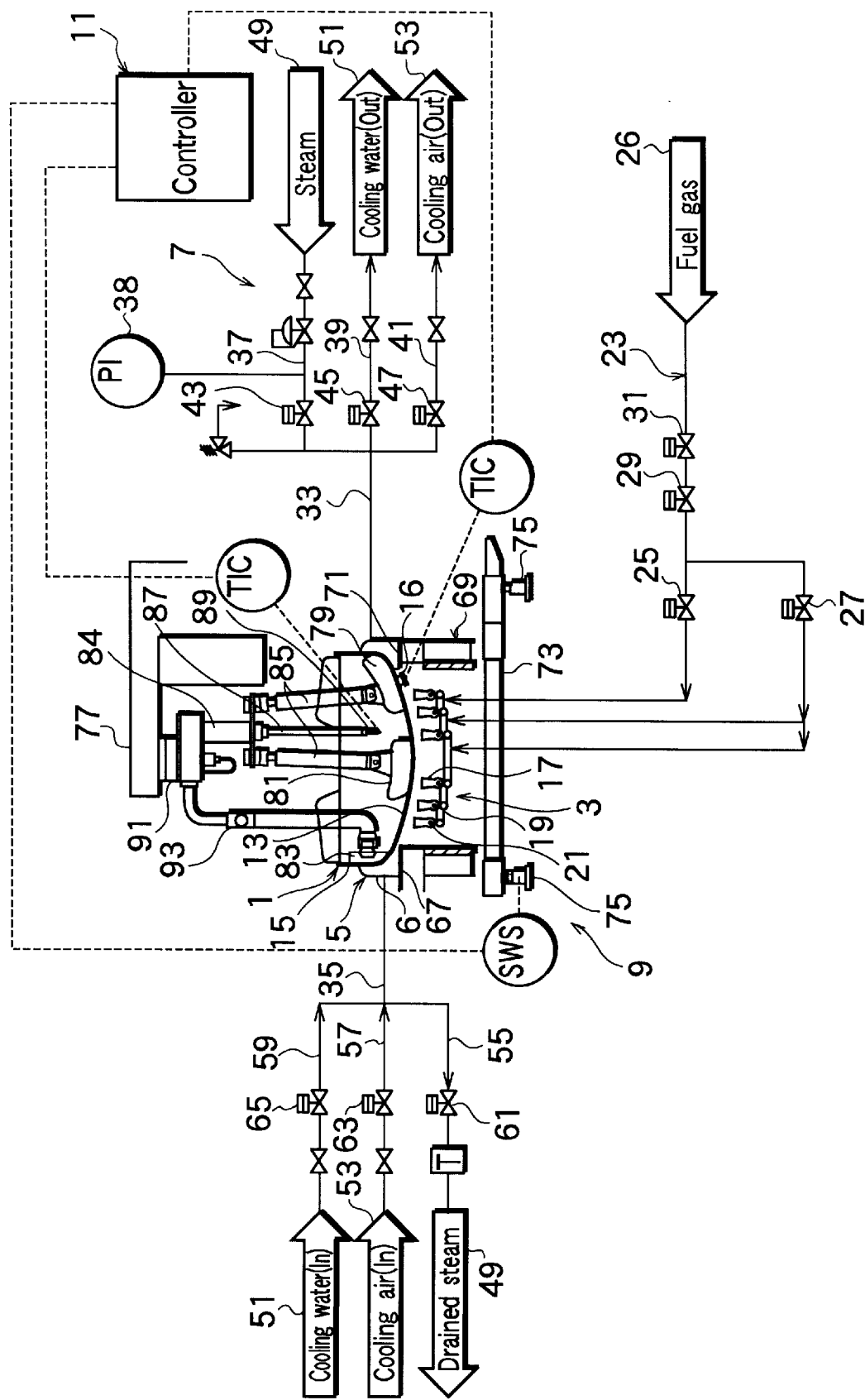
FIG. 1 generally shows a cooking apparatus according to a first embodiment of the present invention.
Figure 2:
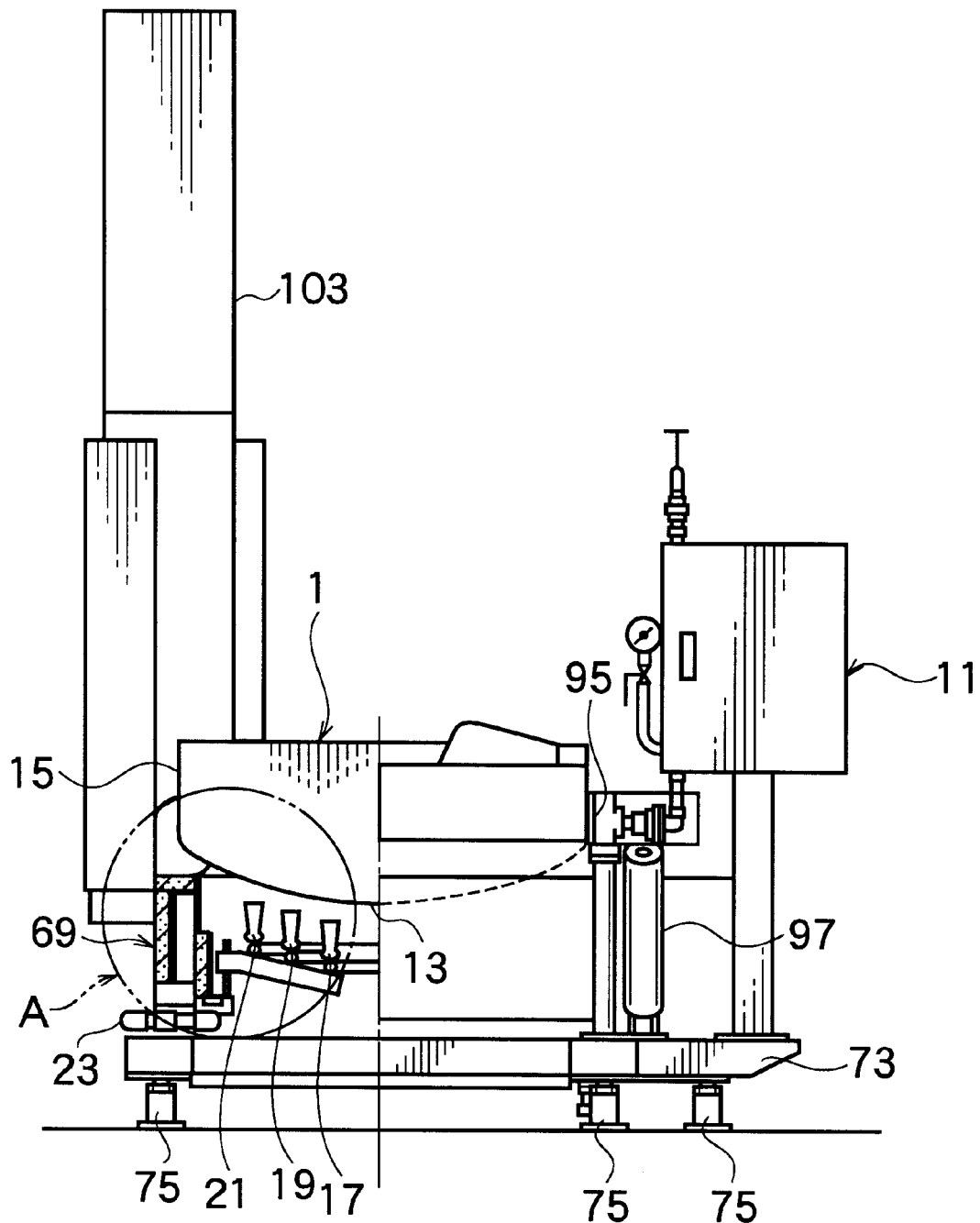
FIG. 2 is a partly broken front view showing the cooking apparatus of the first embodiment.
Figure 3:
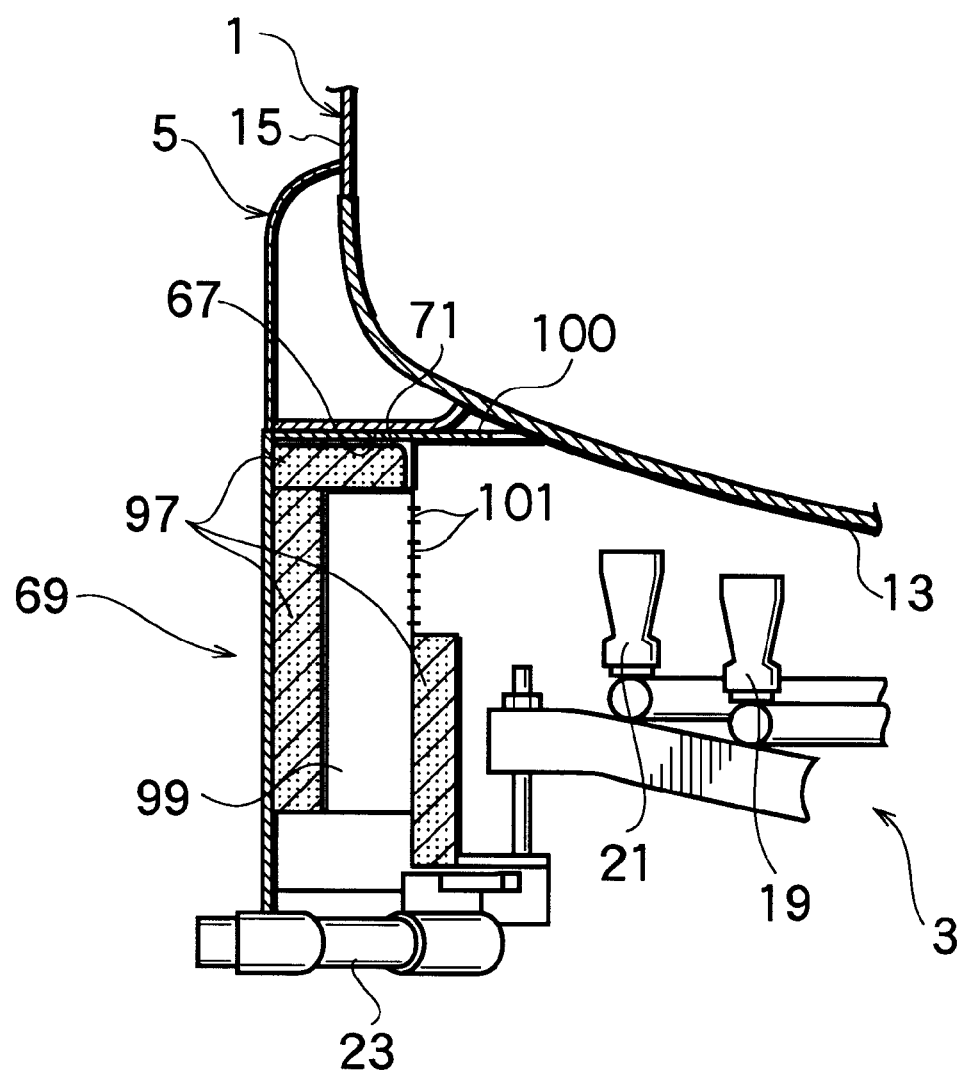
FIG. 3 is an enlarged view showing a part A of FIG. 2.

FIG. 1 generally shows a cooking apparatus according to the first embodiment of the present invention, FIG. 2 is a partly broken front view showing the same, and FIG. 3 is an enlarged view showing a part A of FIG. 2. The cooking apparatus of the first embodiment has a cooking vessel 1, a bottom heater 3, a heat exchanging jacket 5, a fluid source 7, a weighing unit 9, and a controller 11.

The cooking vessel 1 receives and cooks food materials. The food materials may be vegetables to be fried, or those to be boiled down to make bean paste, sauce, or soup. The cooking vessel 1 has a bottom 13 of a dish-like or spherical shape and a body 15 rising from the periphery of the bottom 13. The shape of the cooking vessel 1 is not particularly limited. The cooking vessel 1 may be made of iron, stainless steel, multiple layers of iron and stainless steel, copper, or a combination of them. A temperature sensor 16 is attached to the bottom 13, to detect the temperature of the bottom 13. The output of the temperature sensor 16 is transferred to the controller 11.

The bottom heater 3 is arranged under the bottom 13 to heat the same. In this embodiment, the bottom heater 3 is a gas heater having gas burners 17, 19, and 21, which are arranged in rings, respectively, in a plan view. The gas burners 17 and 19 form inner rings, and the gas burner 21 forms an outer ring, so that the inner and outer rings may separately be controlled.

The gas burners 17, 19, and 21 are connected to a gas pipe 23, which is connected to a gas source for supplying fuel gas 26. The gas pipe 23 has solenoid valves 25, 27, 29, and 31 that are controlled by the controller 11. The solenoid valve 27 controls the gas burners 17 and 19, and the solenoid valve 25 controls the gas burner 21.

The jacket 5 is arranged along the body 15 of the cooking vessel 1 and defines a closed space for passing a thermal fluid that exchanges heat with the body 15. More precisely, the jacket 5 covers a corner between the bottom 13 and the body 15 and is continuous around the body 15. The thermal fluid supplied into the jacket 5 exchanges heat with the body 15, to improve a cooking speed. The jacket 5 may be divided into sections at predetermined intervals around the body 15. In this case, the sections of the jacket 5 may separately be controlled to pass the thermal fluid.

According to the first embodiment, the thermal fluid supplied from the fluid source 7 includes steam, water, and air. If the jacket 5 is required only to heat the cooking vessel 1, the thermal fluid is only steam.

The fluid source 7 has an upper pipe 33 and a lower pipe 35. The upper pipe 33 is connected to an upper part of the jacket 5 on one side thereof. The lower pipe 35 is connected to a lower part of the jacket 5 on the other side thereof. The upper pipe 33 is branched into pipes 37, 39, and 41 having solenoid valves 43, 45, and 47, respectively. The solenoid valves 43, 45, 47 are controlled by the controller 11. The pipe 37 supplies steam 49 and has a pressure sensor 38 whose output is transferred to the controller 11. The pipe 39 drains cooling water 51, and the pipe 41 drains cooling air 53.

The lower pipe 35 is branched into pipes 55, 57, and 59 having solenoid valves 61, 63, and 65, respectively. The solenoid valves 61, 63, and 65 are controlled by the controller 11. The pipe 55 drains the steam 49. The pipe 57 supplies the cooling air 53, and the pipe 59 supplies the cooling water 51.

The bottom of the jacket 5 has a flat face 67 along the length of the jacket 5. The flat face 67 faces a top face 71 of a heat insulating wall 69. The heat insulating wall 69 surrounds the gas heater 3 and is supported by a base 73. The heat insulating wall 69 thermally insulates the jacket 5 from the gas heater 3.

The base 73 has legs 75. Each leg 75 has a load cell whose output is transferred to the controller 11. The load cells form the weighing unit 9. The controller 11 averages the outputs of the load cells, to correctly calculate the gross weight of the cooking vessel 1 and jacket 5. Even if food materials in the cooking vessel 1 are shifted to one side due to stirring, the controller 11 properly receives data from the load cells and averages the data to correctly grasp the gross weight of the cooking vessel 1 and jacket 5. According to the first embodiment, the detected gross weight may include the weights of the cooking vessel 1, jacket 5, and heat insulating wall 69.

The controller 11 stores a reference weight change corresponding to a water-content change to attain a target state of food materials cooked in the cooking vessel 1. Namely, the controller 11 properly controls a water content in the cooking vessel, or the ratio of the weight of water within and around food materials in the cooking vessel 1 to the weight of all materials in the cooking vessel 1, during the cooking of the food materials so that the food materials are finished with a required taste such as sweetness. The controller 11 also monitors a water content in the cooking vessel 1 so that food materials therein are not burned. If required, the controller 11 properly burns food materials in the cooking vessel 1 to add a flavor or color to the food materials.

To correctly achieve various cooking objects, the first embodiment carries out cooking tests in advance to determine the relationships between changes in the weight of food materials cooked in the cooking vessel 1 and water-content changes in the cooking vessel 1 to attain required cooked states of the food materials. The tests are carried out with the use of the load cells attached to the legs 75. Weight changes measured in the tests are stored as reference values in the controller 11, which uses the reference values to attain each cooking object. There are many cooking objects such as frying vegetables, boiling down bean paste, sauce, and soup, stewing food materials, etc., which involve different quantities of food materials, water, seasonings, etc. Accordingly, the first embodiment finds the relationships between changes in the weight of food materials cooked in the cooking vessel 1 and water-content changes in the cooking vessel 1 to attain objective cooked states of the food materials, as well as the relationship between a water content that realizes a required cooked state of food materials and the weight of the food materials in the required cooked state.

According to a change in the gross weight detected by the weighing unit 9, the controller 11 calculates a change in the weight of food materials in the cooking vessel 1 and controls the gas heater 3 and fluid source 7 so as to adjust the weight change to a reference value. The controller 11 controls the gas heater 3 and fluid source 7 through the solenoid valves 25, 27, 43, 45, 47, 61, 63, 65, etc. If a change in the weight of the food materials corresponds to a target water content, the controller 11 stops the gas heater 3 and fluid source 7.

The cooking vessel 1 is provided with a stirring unit 77 having blades 79, 81, and 83, to stir food materials cooked in the cooking vessel 1. According to the first embodiment, the stirring unit 77 is separated from the cooking vessel 1. Instead, the stirring unit 77 and cooking vessel 1 may be supported together on the base 73. In this case, the gross weight detected by the weighing unit 9 includes the weight of the stirring unit 77.

The blades 79 and 81 are attached to branch shafts 85 supported by an eccentric rotary shaft 84. A lower part of the shaft 84 has an auxiliary shaft 87 whose lower end supports a temperature sensor 89 for detecting the temperature of food materials in the cooking vessel 1. The output of the temperature sensor 89 is transferred to the controller 11. The blade 83 is attached to a branch shaft 93 supported by a main shaft 91. The blades 79, 81, and 83 improve a cooking speed to correctly attain a required cooked state of food materials.

FIG. 2 is a front view showing a support structure for the cooking vessel 1. The cooking vessel 1 is rotatably supported with a rotary shaft 95 on one side of the diameter thereof, for example, on this side of FIG. 2. The cooking vessel 1 is connected to a piston-cylinder unit 97 through brackets, etc. By driving the piston-cylinder unit 97, the other side, for example, that side of FIG. 2 of the cooking vessel 1 is raised around the shaft 95 to discharge cooked food materials from the cooking vessel 1.

FIG. 3 is an enlarged sectional view showing a part A of FIG. 2. In FIGS. 2 and 3, the heat insulating wall 69 has heat insulators 97 to define a hollow 99. The hollow 99 surrounds the gas heater 3. The top of the heat insulating wall 69 is provided with a shield plate 100. The heat insulating wall 69 and shield plate 100 thermally separate the jacket 5 from the gas heater 3, to prevent heat generated by the gas heater 3 from directly affecting the jacket 5. The inside of the heat insulating wall 69 is provided with many through holes 101 to communicate with the gas heater 3. A part of the heat insulating wall 69 is connected to an exhaust duct 103 that communicates with the hollow 99. The through holes 101, hollow 99, and exhaust duct 103 discharge burned gas from the gas heater 3.

The operation of the cooking apparatus of the first embodiment will be explained. Food materials such as vegetables, water (if required), seasonings, etc., in predetermined quantities are charged into the cooking vessel 1. The timing of putting the water and seasonings into the cooking vessel 1 may be after the start of heating the cooking vessel 1 depending on a cooking object. The quantities of food materials, water, seasonings, etc., are predetermined for different cooking objects through tests so as to attain proper water contents for the cooking objects. Results of the tests are used to determine the quantities of food materials, water, seasonings, etc., for a given cooking object. This greatly improves workability.

The controller 11 controls the solenoid valves 25 and 27 of the gas heater 3. The fuel gas 26 is passed through the pipe 23, is jetted from the gas burners 17, 19, and 21, and is automatically ignited. The gas heater 3 heats the bottom 13 of the cooking vessel 1 to a high temperature. At the same time, the controller 11 controls the solenoid valves 43 and 61, so that the steam 49 is passed through the pipe 37 into the jacket 5. The steam 49 may be saturated steam or superheated steam depending on requirements. The steam 49 in the jacket 5 exchanges heat with the body 15 of the cooking vessel 1, thereby heating the body 15.

The food materials such as vegetables filled to the top of the cooking vessel 1 are cooked at high speed with the heat from the gas heater 3 and jacket 5. The heat to the bottom 13 is conducted to the body 15 where the steam is present in the jacket 5. Accordingly, the heat from the bottom 13 does not escape to the outside but is efficiently conducted to the inside of the cooking vessel 1.

If the food materials in the cooking vessel 1 are vegetables to be fried, they quickly shrink from the top of the cooking vessel 1 toward the bottom 13 and are cooked at high temperature due to the heat from the gas heater 3.

If the vegetables are cooked at high temperature only with the gas heater under the bottom 13 like the prior art and if the gas heater is driven powerfully to shorten a cooking time, the vegetables will burn. To avoid this, the prior art must decrease the power of the gas heater, to elongate a cooking time.

On the other hand, the first embodiment heats the bottom 13 with the gas heater 3 and the body 15 with the steam 49 in the jacket 5. As a result, the vegetables quickly shrink toward the bottom 13 and are cooked at high temperature by the gas heater 3. Namely, the hybrid heating of the first embodiment is capable of cooking food materials in a short time.

During cooking, the stirring unit 77 turns the main shaft 91 that drives the eccentric shaft 84 around the main shaft 91. At the same time, the branch shafts 85 revolve around the eccentric shaft 84. As a result, the blades 79 and 81 turn around the eccentric shaft 84 while revolving around the main shaft 91. Simultaneously, the blade 83 turns around the main shaft 91. These blades 79, 81, and 83 stir and cook the food materials in the cooking vessel 1 at high temperature and high speed.

If the food materials are vegetables to be fried, the vegetables will quickly shrink toward the bottom 13. At this time, the controller 11 controls the solenoid valves 43 and 61 to drain the steam from the jacket 5 or stop the steam to the jacket 5, thereby weakening or stopping heat exchange by the steam. Namely, the heat exchange on the body 15 is weakened or stopped. As a result, the vegetables that are shrinking toward the bottom 13 will never be overcooked or burned by the steam around the body 15.

The controller 11 may control the solenoid valves 45, 47, 63, and 65 to introduce cooling water or air into the jacket 5 to forcibly cool the body 15. This surely prevents the burning of the vegetables on the body 15. The controller 11 supplies steam first to heat the body 15 and then supplies water or air to cool the body 15 so that the vegetables in the cooking vessel 1 may not burn on the body 15 when shrinking toward the bottom 13. The cooling of the body 15 does not affect the high-temperature cooking of the vegetables with the gas heater 3 because the vegetables are mostly shrunk and are present around the bottom 13. For some food materials, the gas heater 3 is stopped after cooking the food materials, and the cooling water 51 or cooling air 53 is actively introduced into the jacket 5 to cool the food materials in the cooking vessel 1.

A water content in the cooking vessel 1, or the ratio of the weight of water within and around food materials in the cooking vessel 1 to the weight of all materials in the cooking vessel 1, is an important factor to determine the sweetness, saltiness, taste, or burning of the food materials cooked in the cooking vessel 1. Accordingly, the first embodiment provides the weighing unit 9 consisting of, for example, load cells for the legs 75 to detect a gross weight. According to the gross weight, the controller 11 calculates a change in the weight of food materials in the cooking vessel 1, compares the calculated change with a reference value, and controls the gas heater 3 and fluid source 7 to make the calculated change agree with the reference value. It is possible to prepare a gross-weight reference value based on the weights of the cooking vessel and food materials and directly compare the reference value with a gross weight detected during cooking.

To control a water content in the cooking vessel 1, the first embodiment may control the solenoid valves 25 and 27 to selectively control the outer gas burner 21 and the inner gas burners 17 and 19. At the same time, the first embodiment may control the blades 79, 81, and 83 to control the water content. The relationships between water contents and the stirring conditions of the blades 79, 81, and 83 are measured in advance through tests and are stored in the controller 11.

The first embodiment also controls the solenoid valves 43, 45, 47, 61, 63, and 65 to selectively supply and drain steam, cooling water, and cooling air to and from the jacket 5, thereby controlling the temperature of food materials in the cooking vessel 1.

Through these control measures, the first embodiment correctly controls water in the cooking vessel 1 and attains a required cooked state of food materials cooked in the cooking vessel 1. Accordingly, food materials cooked according to the first embodiment surely have a target water content.

When boiling down food materials to prepare bean paste, sauce, or soup, the first embodiment stops the gas heater 3 and fluid source 7 if the weight of the food materials in the cooking vessel 1 agrees with a value that corresponds to a required water content. As a result, the cooked food materials have a target water content.

To correctly attain a target water content, it is necessary to consider water to evaporate due to heat remaining in the cooking vessel 1 after the stoppage of heating the cooking vessel 1. Such evaporation due to remnant heat can be eliminated by introducing cooling water or cooling air into the jacket 5 as soon as the heating of the cooking vessel 1 is stopped.

Some food materials need positive burning to add a color or flavor thereto. In this case, the cooking of the food materials must strictly be controlled because excessive burning spoils the color and flavor thereof. The first embodiment carries out cooking tests in advance to determine the relationships between the weights of food materials and the water contents thereof and stores the relationships as reference values in the controller 11. The reference values are used to correctly burn food materials cooked in the cooking vessel 1.

The hybrid heating of the first embodiment is capable of cooking food materials at temperatures and speeds that are substantially double those of the prior art. Unlike the prior art that relies on the skill of workers, the first embodiment is capable of correctly cooking food materials without skill or overheating, to realize a target cooked state of the food materials. Namely, the first embodiment is capable of cooking food materials at high temperature within a short time without skill.

When detecting and controlling a weight change related to food materials cooked in the cooking vessel 1, the first embodiment may display a water content on, for example, a liquid-crystal display so that workers may visually confirm a deviation from a reference value. This enables the workers to confirm in real time whether or not the cooking apparatus is operating properly and is cooking food materials correctly. The cooking apparatus may have an alarm such as a buzzer to inform workers who are at remote positions of an abnormality occurring in the cooking apparatus, so that the workers may stop and repair the cooking apparatus.

For some food materials, it is necessary to select outward or inward convection in the cooking vessel 1. In this case, the first embodiment controls, through the controller 11, the solenoid valves 25 and 27 to stop or activate the inner gas burners 17 and 19 and the outer gas burner 21, to cause required convection.

Although the first embodiment explained above cooks vegetables that shrink toward the bottom 13 of the cooking vessel 1, the cooking apparatus of the first embodiment is capable of cooking any other food materials such as cream that inflates during cooking. When cooking cream, the first embodiment controls the gas heater 3 and fluid source 7 as mentioned above to control the water content of the cream to attain a required cooked state.

While the gas heater 3 is operating, the first embodiment surely discharges exhaust from the gas heater 3 through the holes 101, hollow 99, and exhaust duct 103. The heat insulating wall 69 thermally separates the jacket 5 from the gas heater 3, to prevent heat radiation from the gas heater 3 from affecting the jacket 5.

(Second Embodiment)

Figure 4:
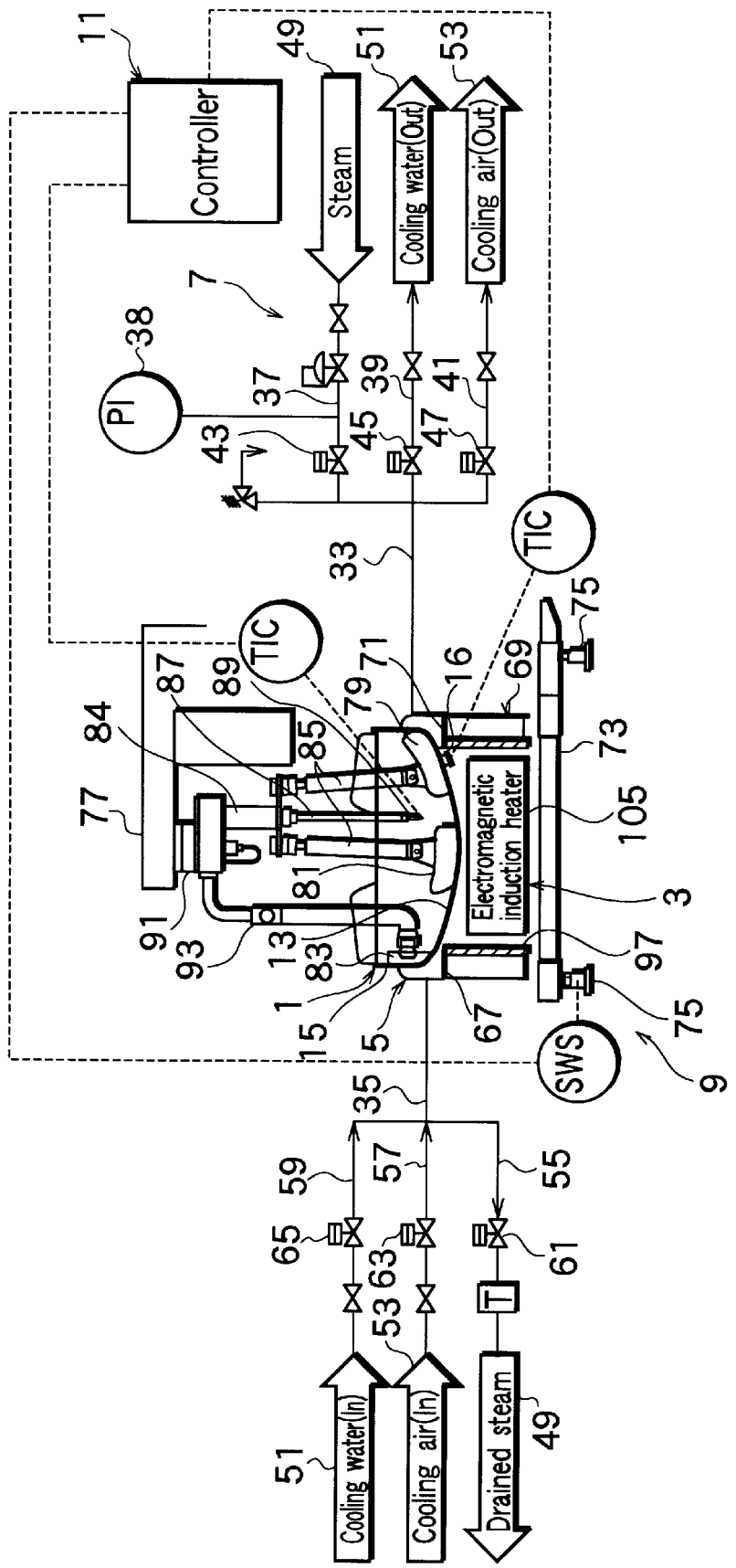
FIG. 4 generally shows a cooking apparatus according to a second embodiment of the present invention.

FIG. 4 generally shows a cooking apparatus according to the second embodiment of the present invention. The same parts as those of the first embodiment are resented with like reference numerals.

The second embodiment employs an electromagnetic induction heater 105 as a bottom heater, which is arranged under a bottom 13 of a cooking vessel 1. The heater 105 electrically controlled by a controller 11. Like the gas heater of the first embodiment, the heater 105 has an annular outer part and an annular inner part that are separately controlled by the controller 11.

The second embodiment provides substantially the same effect as the first embodiment. Due to the electromagnetic induction heater 105, the controller 11 of the second embodiment is simpler than that of the first embodiment. In addition, the second embodiment needs no gas piping or exhaust mechanism required for the gas heater. As a result, the cooking apparatus of the second embodiment is compact.

Instead of employing gas or electromagnetic induction, the heater of the present invention may employ electricity, i.e., an electric heater with heating coils. Alternatively, the bottom 13 of the cooking vessel 1 may have a heat exchanging jacket for passing steam to heat there. In this case, steam for a heat exchanging jacket 5 for heating a body 15 of the cooking vessel 1 may be reheated and supplied as superheated steam to the jacket for the bottom 13. The jacket for the bottom 13 may have a separate system for supplying superheated steam. The jacket 5 for the body 15 may be replaced with a heating coil or an electromagnetic induction heater. Instead of solenoid valves, the first and second embodiments may employ air valves, motor valves, or any other valves.

Any one of the first and second embodiments may omit the weighing unit 9, etc.

(Third Embodiment)

Figure 5:
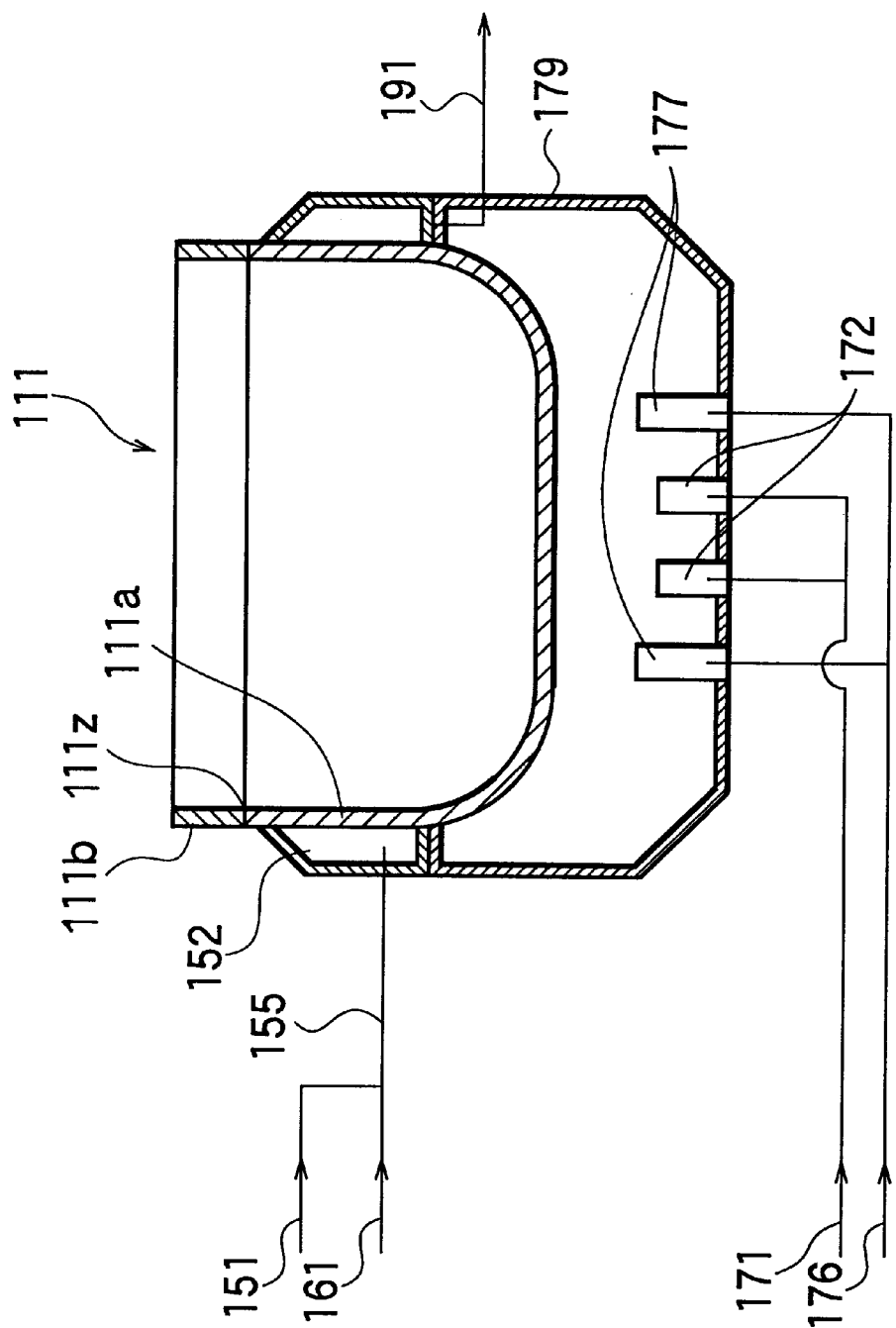
FIG. 5 generally shows a cooking apparatus according to a third embodiment of the present invention.

FIG. 5 generally shows a cooking apparatus according to the third embodiment of the present invention. The cooking apparatus has a cooking vessel 111 having a flat bottom, a vertically raised cylindrical body, and a U-shaped section. The cooking vessel 111 is separated at a joint 111z above a jacket 152 into a lower body 111a and an upper body 111b.

The lower and upper bodies 111a and 111b are made of different materials selected from, for example, iron, stainless steel, multiple layers of iron and stainless steel, and copper. The lower body 111a may be made of material having a higher heat conductivity because the lower body 111a is in contact with heat sources 152, 172, and 177 and is required to smoothly conduct heat.

The lower body 111a may be made of multiple layers of iron and stainless steel with an innermost layer being made of stainless steel, and the upper body 111b may be made of stainless steel. Alternatively, the lower body 111a may be made of copper, and the upper body 111b of stainless steel. The joint 111z is a welding line to join the lower and upper bodies 111a and 111b together.

The bottom heater is arranged under the cooking vessel 111. The bottom heater has the inner gas burner 172 connected to a gas pipe 171 and the outer gas burner 177 connected to a gas pipe 176. The gas pipes 171 and 176 are separately controlled (not shown) to achieve different gas flow rates.

The jacket 152 is formed along the body of the cooking vessel 111. The jacket 152 communicates with a water pipe 151 and a steam pipe 161 through a junction pipe 155 so that the flow rates and pressures of water and steam may separately be controlled and so that any one of water and steam may be supplied to the jacket 152. The temperatures of water and steam may be set to required levels in advance.

The jacket 152 has a drain pipe 191 for draining water from the jacket 152. A cover 179 is extended from the jacket 152 to prevent heat generated by the gas burners 172 and 177 from escaping.

In FIG. 5, the joint 111z between the lower body 111a and the upper body 111b is above the jacket 152. The position of the joint 111z is not limited to this. It may be anywhere between the outer gas burner 177 and the top of the jacket 152. Although the jacket 152 is arranged along the body of the cooking vessel 111, it may be arranged along the periphery of the bottom of the cooking vessel 111.

The operation of the third embodiment will be explained.

Food materials and water (if required) are charged into the cooking vessel 111. The gas burners 172 and 177 are ignited, and steam is introduced into the jacket 152.

The two heat sources, i.e., high-temperature gas and high-calorie steam increase the water in the cooking vessel 111 to 100 degrees centigrade within a short time that is about 25% to 30% a boiling time realized by gas, or 75% to 80% a boiling time realized by steam.

In addition to the short boiling time, the third embodiment secures high cooking temperature due to the gas heater. The gas burners 172 and 177 and the jacket 152 are separately controllable. Water in the jacket 152 is drained through the drain pipe 191.

The gas burners 172 and 177 under the cooking vessel 111 provide strong heating power, which is efficiently conducted through the lower body 111a made of material having a high heat conductivity.

When boiling down food materials in the cooking vessel 111 for a long time after cooking them to some extent, the food materials along the top of the cooking vessel 111 may burn. To prevent the burning, the jacket 152 may pass water to cool the cooking vessel 111 along the jacket 152.

(Fourth Embodiment)

Figure 6:
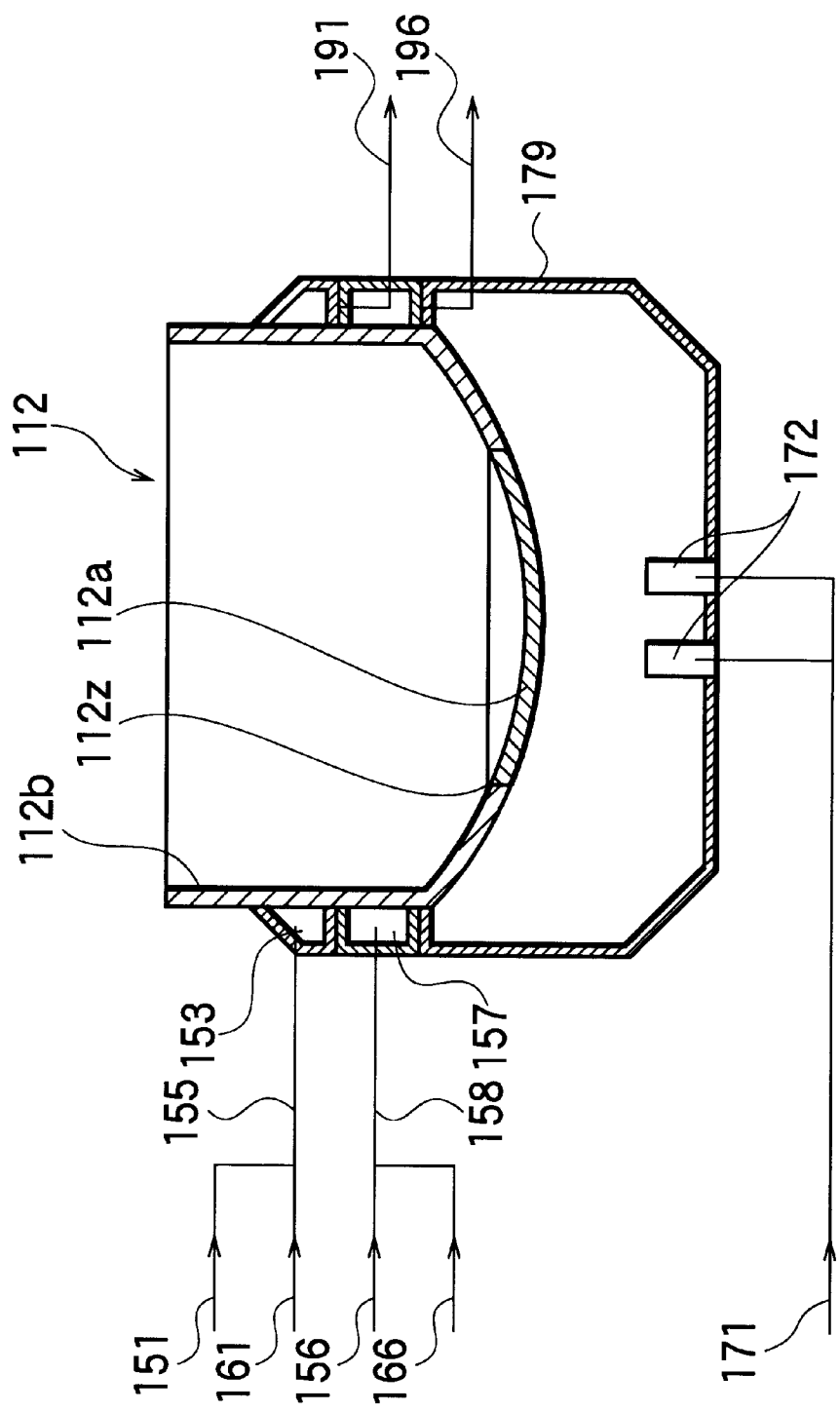
FIG. 6 generally shows a cooking apparatus according to a fourth embodiment of the present invention.

FIG. 6 generally shows a cooking apparatus according to the fourth embodiment of the present invention.

The cooking apparatus has a cooking vessel 112 having a spherical bottom, a vertically raised body, and a U-shaped section. The cooking vessel 112 is divided along a joint 112z into a bottom 112a and a body 112b which are made of different materials.

The materials of the cooking vessel 112 may be the same as those of the cooking vessel 111 of the third embodiment. The bottom 112a may be made of material having a higher heat conductivity to quickly conduct heat generated by a gas burner 172. The joint 112z is a welding line between the bottom 112a and the body 112b.

The gas burner 172 is arranged under the bottom 112a and is connected to a gas pipe 171. A flow rate of gas passed through the gas pipe 171 is adjustable (not shown).

The body 112b has a vertical wall provided with heat exchanging jackets 153 and 157. The upper jacket 153 is connected to a junction pipe 155, which is connected to a water pipe 151 and a steam pipe 161. The lower jacket 157 is connected to a junction pipe 158, which is connected to a water pipe 156 and a steam pipe 166.

The quantities and pressures of water and steam supplied to the jackets 153 and 157 are controllable. The water and steam are separately or simultaneously supplied to the jackets 153 and 157. The upper and lower jackets 153 and 157 are connected to the separate piping systems, and therefore, the temperatures thereof are separately controllable. Water and steam to the jackets 153 and 157 may be preset to required temperatures.

The jackets 153 and 157 are connected to drain pipes 191 and 196, respectively, to drain water from the jackets 153 and 157. A cover 179 is extended from the lower jacket 157, to prevent the escape of heat generated by the gas burner 172.

The joint 112z between the bottom 112a and the body 112b is positioned between the outer diameter of the gas burner 172 and the outer diameter of the cooking vessel 112 in FIG. 6. This does not limit the present invention. The joint 112z may be positioned anywhere between the outer diameter of the gas burner 172 and the top of the upper jacket 153.

The operation of the fourth embodiment will be explained.

Food materials and, if required, water are charged into the cooking vessel 112. Gas is supplied to the gas burner 172 and is ignited. At the same time, steam is introduced into the upper and lower jackets 153 and 157.

The fourth embodiment simultaneously supplies high-temperature gas and high-calorie steam to provide the same effect as the first to third embodiments.

The gas burner 172 strongly heats the bottom 112a of the cooking vessel 112. Heat generated by the gas burner 172 is easily propagated through the bottom 112a, which is made of material having a high heat conductivity.

When boiling down food materials in the cooking vessel 112 for a long time after cooking them to some extent, the food materials along the top of the cooking vessel 112 may burn. In this case, water is supplied to one or both of the jackets 153 and 157, to cool the cooking vessel 112 along jackets 153 and 157. Consequently, the fourth embodiment is capable of boiling down food materials without burning them.

(Fifth Embodiment)

Figure 7:
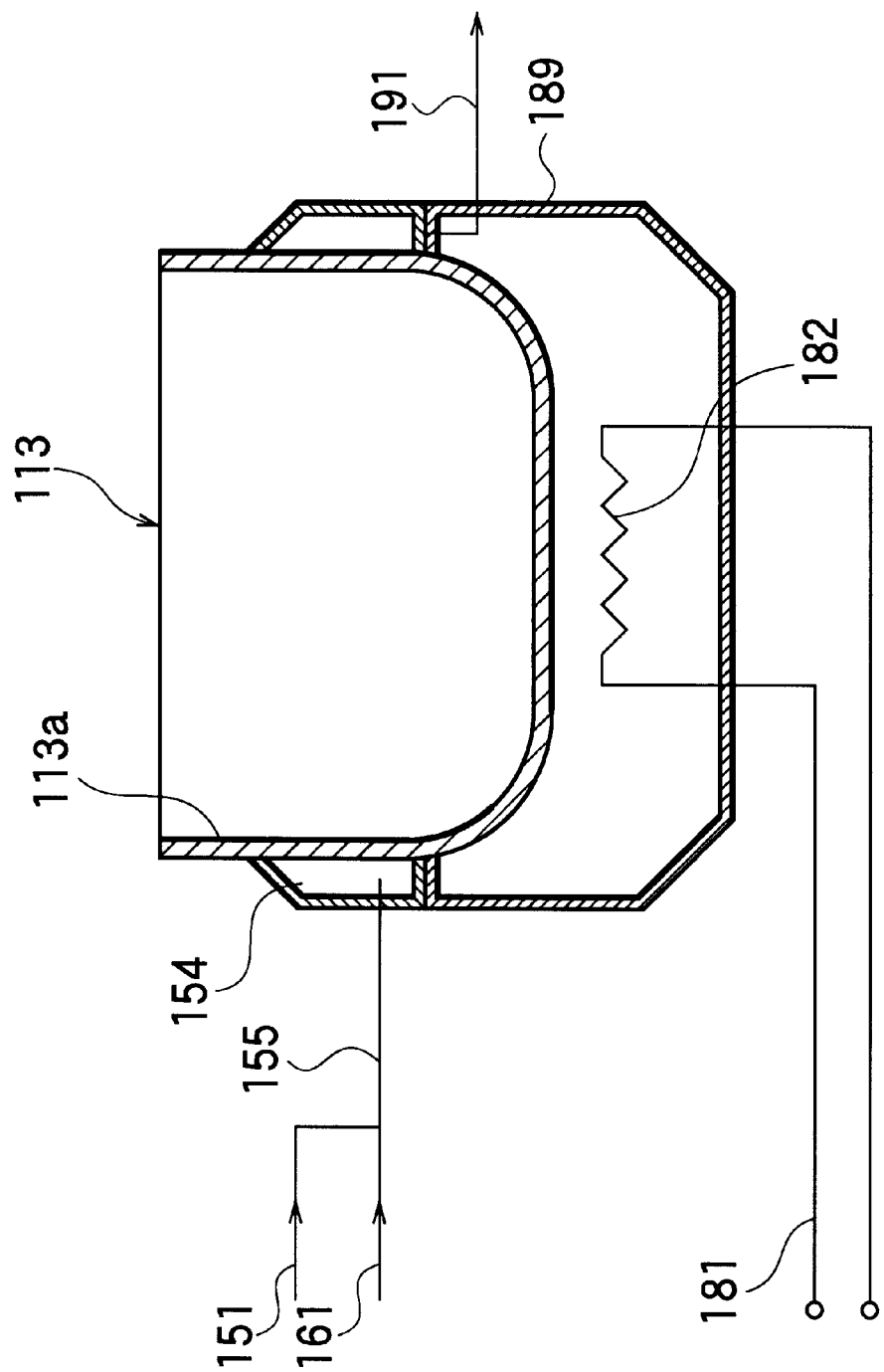
FIG. 7 generally shows a cooking apparatus according to a fifth embodiment of the present invention.

FIG. 7 shows a cooking apparatus according to the fifth embodiment of the present invention.

The cooking apparatus has a cooking vessel 113. The cooking vessel 113 has a flat bottom, a vertical cylindrical body 113a, and a U-shaped section. The body 113a is monolithic.

The material of the cooking vessel 113 may be any one of the materials mentioned in the third embodiment.

A bottom heater 182 is arranged under the bottom of the cooking vessel 113 and is connected to an electric line 181. The bottom heater 182 is an electric heater such as a heating coil. The heating coil may be a Nichrome wire, an induction coil, etc. The electric line 181 has a unit (not shown) for controlling the heating coil 182.

The vertical wall of the cooking vessel 113 is provided with a heat exchanging jacket 154. The jacket 154 is connected to a junction pipe 155, which is connected to a water pipe 151 and a steam pipe 161.

The jacket 154 is connected to a drain pipe 191 for draining water from the jacket 154. A cover 189 is extended from the jacket 154 to prevent the escape of heat generated by the heating coil 182.

The operation of the fifth embodiment will be explained.

Food materials and, if required, water are charged into the cooking vessel 113. The heating coil 182 is energized, and at the same time, steam is introduced into the jacket 154.

The fifth embodiment simultaneously uses high-temperature electric heat and high-calorie steam heat, to provide the same effect as the third embodiment.

Current to the heating coil 182 and steam to the jacket 154 are separately controllable.

Various modifications will become possible for those skilled in the art after receiving the teachings of the present disclosure without departing from the scope thereof.

What is claimed is:

1. A cooking apparatus comprising:

a cooking vessel for receiving and cooking food materials;

bottom heating means arranged under the bottom of the cooking vessel, for heating the bottom of the cooking vessel at high temperatures with any one of a gas heater, an electromagnetic induction heater, and an electric heater;

a heat exchanging jacket arranged along the body of the cooking vessel and defining a closed space for passing steam to exchange heat with the body of the cooking vessel; and a fluid source for supplying and draining the steam to and from the heat exchanging jacket, the bottom heating means and the fluid source being separately controlled.

2. A cooking apparatus comprising:

a cooking vessel for receiving and cooking food materials;

bottom heating means arranged under the bottom of the cooking vessel, for heating the bottom of the cooking vessel;

a heat exchanging jacket arranged along the body of the cooking vessel and defining a closed space for passing a thermal fluid to exchange heat with the body of the cooking vessel;

a fluid source for supplying and draining the thermal fluid to and from the heat exchanging jacket;

weighing means for supporting at least the cooking vessel and heat exchanging jacket and detecting the gross weight of at least the cooking vessel and heat exchanging jacket;

memory means for storing a reference weight change corresponding to a water-content change to attain a target cooked state of the food materials; and control means for controlling at least the bottom heating means according to the detected gross weight and the reference weight change.

3. The cooking apparatus of claim 2, wherein:

the bottom heating means is one of a gas heater, an electromagnetic induction heater, and an electric heater.

4. The cooking apparatus of claim 2, wherein:

the thermal fluid is steam.

5. The cooking apparatus of claim 2, wherein:

the weighing means includes load cells provided for legs of a base for supporting at least the cooking vessel and heat exchanging jacket.

6. The cooking apparatus of claim 2, wherein:

the control means stops the heating of the food materials if the detected gross weight corresponds to a target water content.

* * * * *